US012777484B2

(12) United States Patent
Lin et al.

(10) Patent No.: US 12,777,484 B2
(45) Date of Patent: Oct. 27, 2026

(54) SCHEMES FOR DETERMINING CANDIDATE TRANSMISSION OCCASION IN WIRELESS COMMUNICATIONS

(71) Applicant: ZTE Corporation, Shenzhen (CN)

(72) Inventors: Wei Lin, Shenzhen (CN); Ziyang Li, Shenzhen (CN); Hanqing Xu, Shenzhen (CN); Ling Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 286 days.

(21) Appl. No.: 18/673,152

(22) Filed: May 23, 2024

(65) Prior Publication Data

US 2024/0314783 A1 Sep. 19, 2024

Related U.S. Application Data

(63) Continuation of application No. PCT/CN2021/141854, filed on Dec. 28, 2021.

(51) Int. Cl.
*H04W 72/1273* (2023.01)
*H04W 72/0446* (2023.01)
*H04W 72/51* (2023.01)

(52) U.S. Cl.
CPC ... *H04W 72/1273* (2013.01); *H04W 72/0446* (2013.01); *H04W 72/51* (2023.01)

(58) Field of Classification Search
CPC . H04W 72/23; H04W 72/231; H04W 72/232; H04W 72/0446; H04W 72/1263; H04W 72/1268; H04W 72/1273; H04W 72/51; H04W 74/0808; H04W 74/0816; H04L 5/0044; H04L 5/0053
See application file for complete search history.

(56) References Cited

U.S. PATENT DOCUMENTS

| | | | | |
|---|---|---|---|---|
| 2023/0045728 A1* | 2/2023 | Hooli | .................... | H04L 5/0055 |
| 2023/0198683 A1* | 6/2023 | Gao | .................. | H04W 72/1273 370/280 |
| 2024/0032030 A1* | 1/2024 | Oteri | ..................... | H04L 1/1864 |

FOREIGN PATENT DOCUMENTS

| | | | |
|---|---|---|---|
| CN | 112166573 | A | 1/2021 |
| CN | 112217619 | A | 1/2021 |
| CN | 113747588 | A | 12/2021 |
| KR | 20210120873 | A | 10/2021 |
| WO | 2019/233352 | A1 | 12/2019 |

(Continued)

OTHER PUBLICATIONS

EPO, Extended European Search Report for European Application No. 21969307.4, mailed on Dec. 13, 2024, 12 pages.

(Continued)

*Primary Examiner* — Peter Chen
(74) *Attorney, Agent, or Firm* — Ashurst Perkins Coie US LLP

(57) ABSTRACT

Methods and apparatus for wireless communication are described. In one example method, includes a communication device determines one or more candidate transmission occasions based on a modified parameter set. Here, the modified parameter set includes one or more valid indicators that are valid according to a pre-determined rule. In another example, the method is implemented by an apparatus that includes a processor.

19 Claims, 5 Drawing Sheets

(56) References Cited

FOREIGN PATENT DOCUMENTS

| | | | |
|---|---|---|---|
| WO | 2020/091080 | A1 | 5/2020 |
| WO | 2021/224283 | A1 | 11/2021 |

OTHER PUBLICATIONS

Moderator (LG Electronics), "Summary #4 of PDSCH/PUSCH enhancements (Scheduling/HARQ)," 3GPP TSG RAN WG1 #107-e, e-meeting, R1-2112714, Nov. 11-19, 2021, 118 pages.
ISA, International Search Report for International Application No. PCT/CN2021/141854, mailed on Sep. 27, 2022, 7 pages.
Moderator (LG Electronics), "Summary #3 of PDSCH/PUSCH enhancements (Scheduling/HARQ)," 3GPP TSG RAN WG1 #106-e, e-Meeting, R1-2108370, Aug. 16-27, 2021, 104 pages.
Moderator (LG Electronics), "Summary #5 of PDSCH/PUSCH enhancements (Scheduling/HARQ)," 3GPP TSG RAN WG1 #106-e, e-Meeting, R1-2108590, Aug. 16-27, 2021, 117 pages.
CNIPA, First Office Action for Chinese Application No. 202180104980.8, mailed on Nov. 28, 2024, 15 pages with unofficial English translation.
Moderator (LG Electronics), "Summary #1 of PDSCH/PUSCH enhancements (Scheduling/HARQ)," 3GPP TSG RAN WG1 #105-e, e-Meeting, R1-2105422, May 10-27, 2021, 54 pages.

* cited by examiner

SCHEMES FOR DETERMINING CANDIDATE TRANSMISSION OCCASION IN WIRELESS COMMUNICATIONS

CROSS-REFERENCE TO RELATED APPLICATION

This application is a continuation and claims priority to International Application No. PCT/CN2021/141854, filed on Dec. 28, 2021, the disclosure of which is hereby incorporated by reference herein in its entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for feedback schemes for multiple channels in wireless communication devices.

In one aspect, a wireless communication method is disclosed. The wireless communication method includes determining, by a communication device, one or more candidate transmission occasions based on a modified parameter set, wherein the modified parameter set includes one or more valid indicators that are valid according to a pre-determined rule.

In another aspect, a communication apparatus comprising a processor configured to implement the above-described method is disclosed.

In another aspect, a computer readable medium having code stored thereon, the code, when executed, causing a processor to implement the above-described method is disclosed.

These, and other features, are described in the present document.

DETAILED DESCRIPTION

Figure 1:
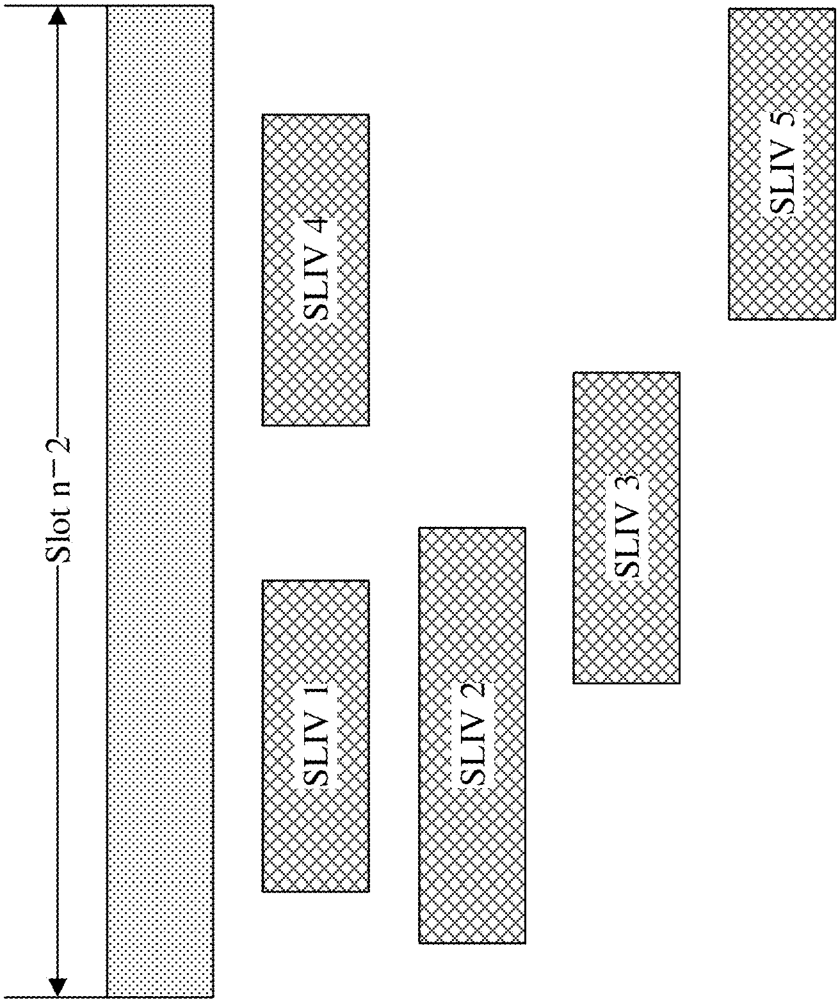
FIG. 1 shows a diagram illustrating a candidate PDSCH (physical downlink shared channel) occasion determination based on a pruning procedure.

The disclosed technology provides implementations and examples of schemes for determining candidate transmission occasion in wireless communications.

In FR 2-2 (52.6-71 GHz), single DCI can schedule multiple PDSCH and the multiple PDSCH can be non-continuous in time-domain. For a DCI that can schedule multiple PDSCHs, the time domain resource allocation (TDRA) table is configured with at least one row with multiple SLIVs (Start and Length Indicator value for the time domain allocation for PDSCH) and each SLIV corresponds a time domain resource allocation for a PDSCH. Single DCI can schedule a row with multiple PDSCHs and some of the PDSCHs can be collided with uplink symbol(s) indicated by tdd-UL-DL-ConfigurationCommon or tdd-UL-DL-ConfigurationDedicated. The collided PDSCH is called as invalid PDSCH or invalid SLIV and the user equipment (UE) does not receive the invalid PDSCH. When the configured SLIV is invalid, the gNB does not transmit the corresponding PDSCH of the invalid SLIV and the UE does not receive the invalid PDSCH.

According to the current regulation, if the last configured SLIV of a row of a TDRA (time domain resource allocation) table designed for transmitting the plurality of downlink transmissions scheduled by downlink control information (DCI) is invalid but the row includes one or more valid SLIVs, the last configured SLIV still participates in the determining of candidate PDSCH occasion and the HARQ-ACK information for all the PDSCH receptions corresponds to valid SLIV bundling with 1 bit when time domain bundling operation for semi-static HARQ-ACK codebook is enabled. If the last configured SLIV of row 1 with multiple SLIVs is invalid and the last configured SLIV of row 1 is overlapped with the last configured SLIV of row 2 in time domain which is valid, gNB may schedule both row 1 and row 2. However, in this case, candidate PDSCH occasion cannot be correctly determined according to the pruning procedure based on the last configured SLIV. According to the current pruning procedure based on the last configured SLIV, gNB shall not schedule both row 1 and row 2 and only one candidate PDSCH occasion is determined. HARQ-ACK can only feedback for row 1 or row 2. However, the last configured SLIV of row 1 is not actually transmitted and both row 1 and row 2 can be scheduled.

The pruning procedure refers to identification of the non-overlapping transmissions within a slot to determine candidate PDSCH occasion based on the SLIV set in a slot and whether the slot supports receiving multiple PDSCHs. The pruning procedure is well known in the art and the detailed explanations will be omitted. According to the pruning procedure, a candidate PDSCH occasion corresponds to a SLIV set, where each SLIV in the SLIV set overlaps with a SLIV which ends with the smallest last OFDM symbol index. In the SLIV set, only one PDSCH reception can be scheduled at the same time and the HARQ-ACK feedback corresponding to the candidate PDSCH occasion is used for feedback decoding result of the PDSCH reception if one of the PDSCH reception corresponding to the SLIV set is transmitted.

For example, in FIG. 1, SLIV 1, SLIV 2 and SLIV 3 belong to a first SLIV set which corresponds a first candidate PDSCH occasion and SLIV 4 and SLIV 5 belong to a second SLIV set which correspond to a second candidate PDSCH occasion. Among SLIV 1, SLIV 2, and SLIV 3, which are included in the first SLIV set, SLIV 1 has the smallest last OFDM symbol index and overlaps with SLIV 2 and SLIV 3. After removing SLIV 1, SLIV 2 and SLIV 3 from slot n−2 according to the pruning procedure, among SLIV 4 and SLIV 5, which are included in the second SLIV set, SLIV 4 has the smallest last OFDM symbol and overlaps with SLIV 5. The first SLIV set and the second SLIV set correspond to different candidate PDSCH occasions. For the first SLIV set, only one SLIV among SLIV 1, SLIV 2 and SLIV 3 can be scheduled at the same time and the HARQ-ACK feedback corresponding the candidate PDSCH occasion is used for feedback decoding result of the PDSCH reception if one of the PDSCH reception corresponding to the first SLIV set {SLIV 1, SLIV 2, SLIV 3} is transmitted.

Various implementations of the disclosed technology suggest schemes for determining one or more candidate PDSCH occasions. Some implementations of the disclosed technology allow a UE and/or a network device to accurately determine candidate PDSCH occasions. By determining the candidate PDSCH occasions accurately, it is also possible to more accurately provide HARQ-ACK feedback when the last configured SLIV in a row of TDRA table is invalid.

For the semi-static HARQ-ACK codebook determination, UE feeds back a bitmap of bits and each bit of bitmap corresponds to a candidate PDSCH occasion. Under some scenarios, a PDSCH reception shall be included in the semi-static HARQ-ACK codebook, even though the actual PDSCH reception is not present. In this case, the semi-static HARQ-ACK feedback contains redundant HARQ-ACK feedback information. If the PDSCH reception is present, UE receives the PDSCH reception and decodes the PDSCH reception and the corresponding HARQ-ACK feedback bit feeds back the decoding result of the PDSCH reception. If the PDSCH reception is not present, the corresponding HARQ-ACK feedback bit feeds back non-acknowledgement or the non-acknowledgement is padded in the corresponding HARQ-ACK feedback bit.

In some implementations of the disclosed technology, for semi-static HARQ-ACK codebook determination, the parameter set is configured to include the last configured SLIV of each target row in a target slot when time domain bundling operation for semi-static HARQ-ACK codebook is enabled and the time domain resource assignment (TDRA) table is configured with at least one row with multiple SLIVs. The target slot is determined based on a slot including PUCCH transmission which feeds backs HARQ-ACK information to gNB and a K1 value, which corresponds to the timing interval between the slot where the HARQ-ACK information feedback is located and a slot where the PDSCH reception ends. The target row is the row that at least contains a valid SLIV based on the target slot. For example, Table 1 shows the TDRA table including 4 rows.

TABLE 1

| TDRA configured for multiple PDSCHs scheduled TDRA table | |
|---|---|
| Row 0 | SLIV 0-0, SLIV 0-1 (start 0, length 14) |
| Row 1 | SLIV 1-0, SLIV 1-1 (start 0, length 4) |
| Row 2 | SLIV 2-0 (start 4, length 5) |
| Row 3 | SLIV 3-0, SLIV 3-1 (start 8, length 5) |

Figure 2:
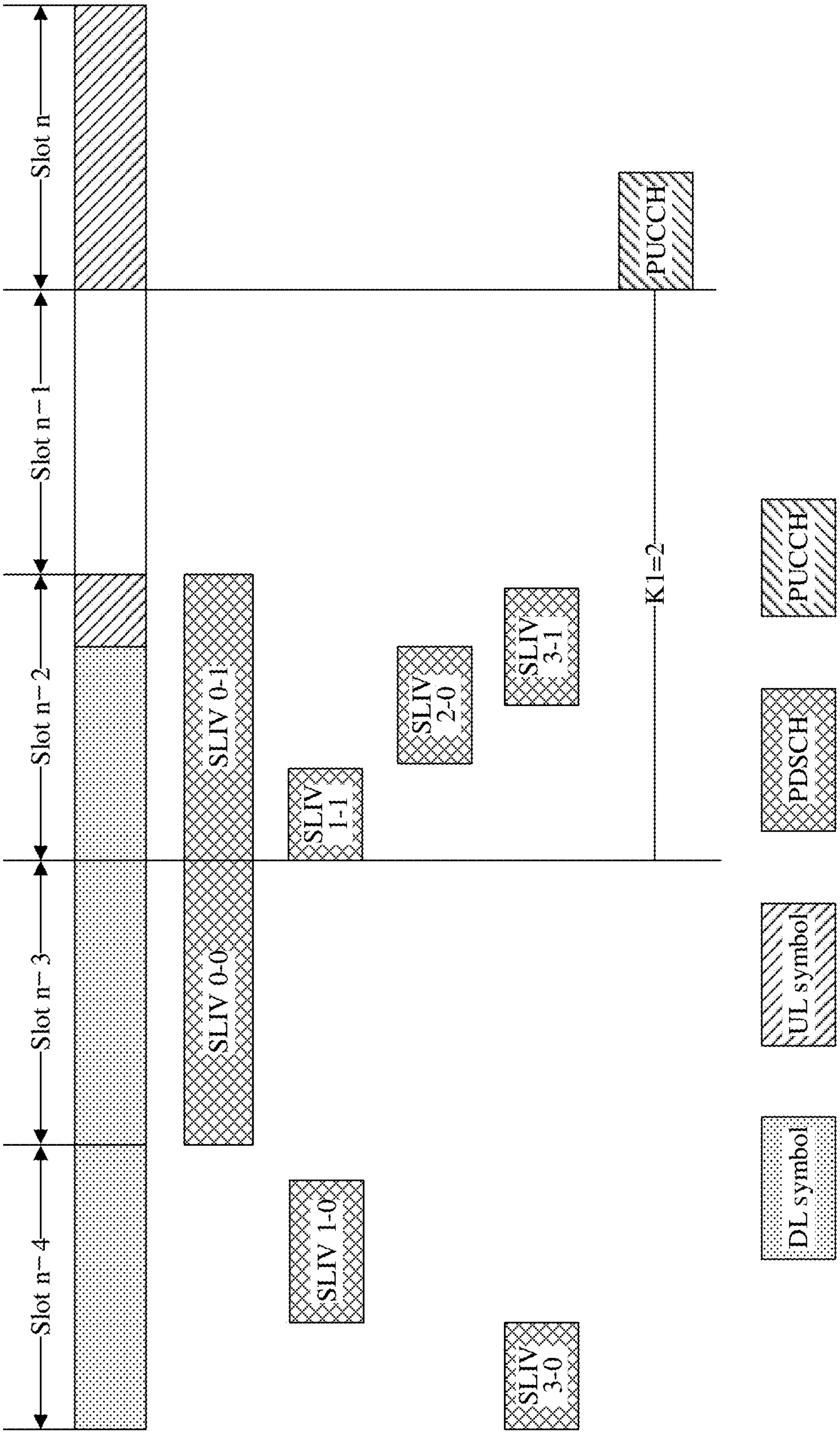
FIG. 2 shows an example of a schematic diagram illustrating a candidate PDSCH (physical downlink shared channel) occasion determination.

FIG. 2 shows an example of a schematic diagram illustrating a candidate PDSCH (physical downlink shared channel) occasion determination. Referring to FIG. 2, a PUCCH including HARQ-ACK information feedback is included in a slot n. In the example of FIG. 2, since K1 value, which corresponds to the timing interval between the slot where the HARQ-ACK information feedback is located and a slot where the PDSCH reception ends is 2, the slot n−2 (which is obtained as subtracting 2 from n) becomes the target slot to be focused to determine the candidate PDSCH reception. The K1 value is usually already known to UE and the base station, e.g., gNB. Thus, the UE and the gNB determine the slot occasion for candidate PDSCH reception for PDSCHs to be ACKed in slot n as those PDSCH occasions that could have been scheduled to report HARQ feedback in slot n based on configured K1 values.

Based on the example as shown in FIG. 2 and TDRA table, the parameter set is configured to include the last configured SLIV of each row of the slot n−2, i.e., SLIV 0-1, SLIV 1-1, SLIV 2-0 and SLIV 3-1.

After the parameter set is configured, validity of each SLIV in the parameter set is checked. For example, the last configured SLIV of a row is invalid when at least one symbol of the PDSCH reception corresponding the configured SLIV is configured as UL by tdd-UL-DL-ConfigurationCommon or tdd-UL-DL-ConfigurationDedicated. Referring to FIG. 2, a part of slot n−2 is configured as UL by tdd-UL-DL-ConfigurationCommon or tdd-UL-DL-ConfigurationDedicated. Among those last configured SLIVs of the parameter set, SLIV 0-1 and SLIV 3-1 collide with the UL symbol and thus correspond to invalid SLIVs.

Based on the checking of the validity, one or more SLIVs checked as invalid are removed from the parameter set. Thus, SLIV 0-1 and SLIV 3-1, which collide with the UL symbol, are removed from the parameter set, which makes the parameter set include only valid last configured SLIVs of all rows in the TDRA table for the slot derived by the slot of HARQ-ACK feedback information and the timing interval K1.

When checking the validity of the last configured SLIV of each row in the TDRA table, the number of occurrences that the last configured SLIV is invalid is counted as the count value, $j_{invalid}$. The count value, $j_{invalid}$, is initially set to be equal to 0 and increases by 1 for each occurrence of invalid SLIV. In the example of FIG. 2, since there are two invalid last configured SLIVs, which are SLIV 0-1 and SLIV 3-1, the count value, $j_{invalid}$, becomes 2.

The total number of candidate PDSCH occasions is determined differently based on whether a UE can support a single PDSCH reception within a slot only or whether the UE can support multiple PDSCH receptions within the slot. In the below, two different implementations are discussed depending on the UE's capability for receiving a single PDSCH reception or multiple PDSCH receptions.

Implementation 1—Single Slot Receiving Single PDSCH Reception

The present implementation is when the UE can support a single slot receiving only a single PDSCH reception.

After the removal of the invalid SLIVs, if the parameter set is the empty set, the total number of candidate PDSCH occasions is set to be equal to $j_{invalid}$. If the parameter set is not the empty set, the total candidate PDSCH occasion is $j_{invalid}+j_{pp}$. Since the total number of candidate PDSCH occasions corresponds to the HARQ-ACK feedback bit, if the parameter set is the empty set, the HARQ-ACK feedback bit is set to be equal to $j_{invalid}$ and if the parameter set is not the empty set, the HARQ-ACK feedback bit is $j_{invalid}+j_{pp}$. In this implementation, since the UE can only support single slot receiving single PDSCH reception, the variable $j_{pp}$ is 1. Thus, if the parameter set is not the empty set, the total number of candidate PDSCH occasions or HARQ-ACK information feedback bit is $j_{invalid}$+1.

In the example of FIG. 2, the parameter set is configured to include the last configured SLIV of each row of the slot n−2, i.e., SLIV 0-1, SLIV 1-1, SLIV 2-0 and SLIV 3-1. After the parameter set is configured, based on the validity check of each SLIV in the parameter set, SLIV 0-1 and SLIV 3-1 are removed from the parameter set, which makes the parameter set only includes SLIV 1-1 and SLIV 2-0. In this case, $j_{invalid}$=2 and $j_{pp}$=1. Since the parameter set is not the empty set, the total number of candidate PDSCH occasions becomes $j_{invalid}$+1=3.

Implementation 2—Single Slot Receiving Multiple PDSCHs

The present implementation is when the UE can support a single slot receiving multiple PDSCH receptions.

After the removal of the invalid SLIVs, if the parameter set is the empty set, the total number of candidate PDSCH occasion or HARQ-ACK information feedback bit is set to be equal to $j_{invalid}$. If the parameter set is not the empty set, the total number of candidate PDSCH occasion or HARQ-ACK information feedback bit is $j_{invalid}$+$j_{pp}$. The variable $j_{pp}$ corresponds to the number of candidate PDSCH occasions obtained from the pruning procedure that is performed based on the parameter set after the removal of the invalid SLIVs.

In the example of FIG. 2, the parameter set is configured to include the last configured SLIV of each row of the slot n−2, i.e., SLIV 0-1, SLIV 1-1, SLIV 2-0 and SLIV 3-1. After the parameter set is configured, based on the validity check of each SLIV in the parameter set, SLIV 0-1 and SLIV 3-1 are removed from the parameter set, which makes the parameter set only includes SLIV 1-1 and SLIV 2-0. In this case, $j_{invalid}$=2 and $j_{pp}$=2. Since the parameter set is not the empty set and the total number of candidate PDSCH occasions becomes $j_{invalid}$+$j_{pp}$=4.

Implementation 3—Determining Order of Candidate PDSCH Occasion

This implementation discusses how to determine an order of corresponding candidate PDSCH occasions or HARQ-ACK information feedback for different PDSCH receptions. This implementation corresponds to an additional procedure of Implementation 1 and/or Implementation 2 and the descriptions to determine the total number of candidate PDSCH occasions as discussed above can be applied hereto. The same descriptions as those discussed with reference to Implementations 1 and 2 are omitted and the descriptions below mainly discuss the additional operations in addition to those discussed with reference to Implementations 1 and 2.

Based on the checking of the validity of each SLIV in the parameter set, one or more SLIVs checked as invalid are removed from the parameter set and moved to another parameter set. Thus, SLIV 0-1 and SLIV 3-1, which collide with the UL symbol, are removed from the parameter set and moved to another parameter set. Thus, the another parameter set is configured to include SLIV 0-1 and SLIV 3-1. The SLIVs in another parameter set are ordered based on the last OFDM symbol index of the SLIV or PDSCH reception. For example, the smaller last OFDM symbol index corresponds to the smaller index of candidate PDSCH occasion or more significant bits of HARQ-ACK information feedback bit.

In the example of FIG. 1, the parameter set is configured to include the last configured SLIV of each row of the slot n−2, i.e., SLIV 0-1, SLIV 1-1, SLIV 2-0 and SLIV 3-1. After the parameter set is configured, based on the validity check of each SLIV in the parameter set, SLIV 0-1 and SLIV 3-1 are removed from the parameter set, which makes the parameter set only includes SLIV 1-1 and SLIV 2-0. The invalid SLIVs removed from the parameter set, SLIV 0-1 and SLIV 3-1, are included in the another parameter set.

For example, the last OFDM symbol index of SLIV 3-1 is 12 and the last OFDM symbol index of SLIV 0-1 is 13. Therefore, between two SLIVs included in the another parameter set, SLIV 3-1 corresponds to the first candidate PDSCH occasion and SLIV 0-1 corresponds to the second candidate PDSCH occasion. If UE can support the single slot receiving single PDSCH reception, since the total number of candidate PDSCH occasions is 3 as discussed above, UE feeds back the bitmap with 3 bits. When UE feeds back the bitmap, the SLIVs included in the another parameter set configure corresponding bits of the HARQ-ACK feedback based on the last OFDM symbol indices of corresponding SLIV receptions. As discussed above, the SLIVs in another parameter set are ordered based on the last OFDM symbol index of the SLIV or PDSCH reception and the smaller last OFDM symbol index corresponds to the smaller index of candidate PDSCH occasion or more significant bits of HARQ-ACK feedback bit. In the example of FIG. 2, when UE feeds back the bitmap of 3 bits, SLIV 3-1 (row 3) corresponds to the most significant bit, SLIV 0-1 (row 0) corresponds to the middle bit, and SLIV 1-1 (row 1) or SLIV 2-0 (row 2) corresponds to the least significant bit. Determining either SLIV 1-1 (row) or SLIV 2-0 (row 2) as the least significant bit is performed as known in the art and thus the detailed descriptions will be omitted. If UE can support the single slot receiving multiple PDSCH receptions, since the total number of candidate PDSCH occasions is 4, UE feeds back a bitmap of 4 bits. In the example of FIG. 2, when UE feeds back the bitmap of 4 bits, SLIV 3-1 (row 3) corresponds to the most significant bit, SLIV 0-1 (row 0) corresponds to the second significant bit, SLIV 1-1 (row 1) corresponds the third significant bit, and SLIV 2-0 (row 2) corresponds to the least significant bit. Determining SLIV 1-1 (row) and SLIV 2-0 (row 2) as the third significant bit and the least significant bit, respectively, is performed as known in the art and thus the detailed descriptions will be omitted.

Implementation 3 can be applied to following three cases:

Case 1: There exists one candidate PDSCH occasion for the last configured invalid SLIV set.

Case 2: There exist more than one candidate PDSCH occasions for the last configured invalid SLIV set.

Case 3: There exist one or more candidate PDSCH occasions for the last configured valid SLIV set.

For Case 2, the order of candidate PDSCH occasions for the last configured invalid SLIV set is determined based on the last symbol index of the corresponding invalid SLIV set and the smaller symbol index corresponds the smaller candidate PDSCH occasion index.

When Case 1 or Case 2 appear with Case 3 for the same PUCCH transmission which feeds back HARQ-ACK information, one or more candidate PDSCH occasions for the last configured invalid SLIV set correspond to first one or more candidate PDSCH occasions and one or more candidate PDSCH occasions for the last configured valid SLIV set is appended. The order of one or more candidate PDSCH occasions for Case 3 is determined by pruning procedure.

Figure 3:
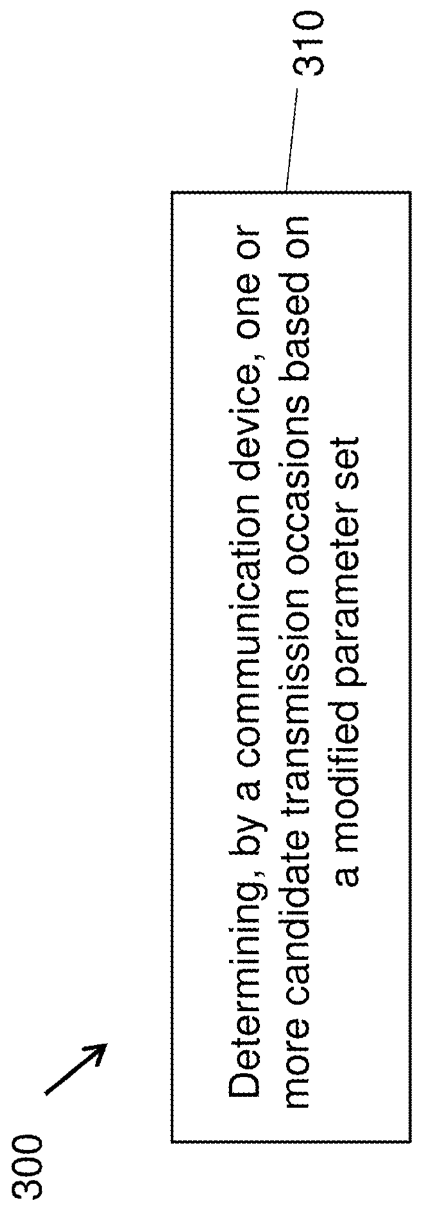
FIG. 3 illustrates a flowchart showing an example method of wireless communication based on some implementations of the disclosed technology.

FIG. 3 illustrates a flowchart showing an example method of wireless communication based on some implementations of the disclosed technology. At operation 310, the method 300 includes determining, by a communication device, one or more candidate transmission occasions based on a modified parameter set, wherein the modified parameter set includes one or more valid indicators that are valid according to a pre-determined rule.

In some implementations, the method 300 further includes checking a validity of the each indicator based on the predetermined rule; and removing the one or more invalid indicators from a first parameter set a first parameter set including 1) the one or more valid indicators or 2) one or more invalid indicators to provide the modified parameter set.

In some implementations, each indicator corresponds to a SLIV (start and length indicator for a time domain allocation for a corresponding physical downlink shared channel (PDSCH)) that is a last configured SLIV in each row of a time domain resource allocation (TDRA) table.

In some implementations, the determining determines the one or more candidate transmission occasions based on a capability of a user device for receiving multiple transmissions within a slot.

In some implementations, the multiple transmissions correspond to multiple PDSCH (physical downlink shared channel) receptions.

In some implementations, the method 300 further comprises: counting a number of the one or more invalid indicators, $j_{invalid}$.

In some implementations, the determining determines a total number of the one or more candidate transmission occasions is set to be equal to $j_{invalid}$ in case that the modified parameter set is an empty set, and the determining determines the total number of the one or more candidate transmission occasions is $j_{invalid}+j_{pp}$ in case that the modified parameter set is not the empty set, where $j_{pp}$ corresponds to a number of candidate transmission occasion obtained by a pruning procedure that identifies a non-overlapping transmission within the slot based on the modified parameter set.

In some implementations, wherein $j_{pp}$ is set to 1 for a user device capability of receiving a single candidate transmission occasion only within the slot and $j_{pp}$ is set to a value equal to or greater than 1 for the user device capability of receiving multiple candidate transmission occasions within the slot.

In some implementations, the method 300 further comprises: configuring a second parameter set to include the one or more invalid indicators that are removed from the first parameter set, wherein the one or more invalid indicators in the second parameter set are used to determine the one or more candidate transmission occasions.

In some implementations, each invalid indicator in the second parameter set corresponds a candidate transmission occasion.

In some implementations, the method 300 further comprises: determining an order of the one or more invalid indicators based on a last OFDM symbol index of each of the one or more invalid indicators.

In some implementations, the order is determined such that an invalid indicator with a smaller last OFDM symbol index corresponds to a candidate transmission occasion with a smaller index or a more significant bit of the feedback information as compared to another invalid indicator in the second parameter set.

In some implementations, the communication device is a user device or a base station.

Figure 4:
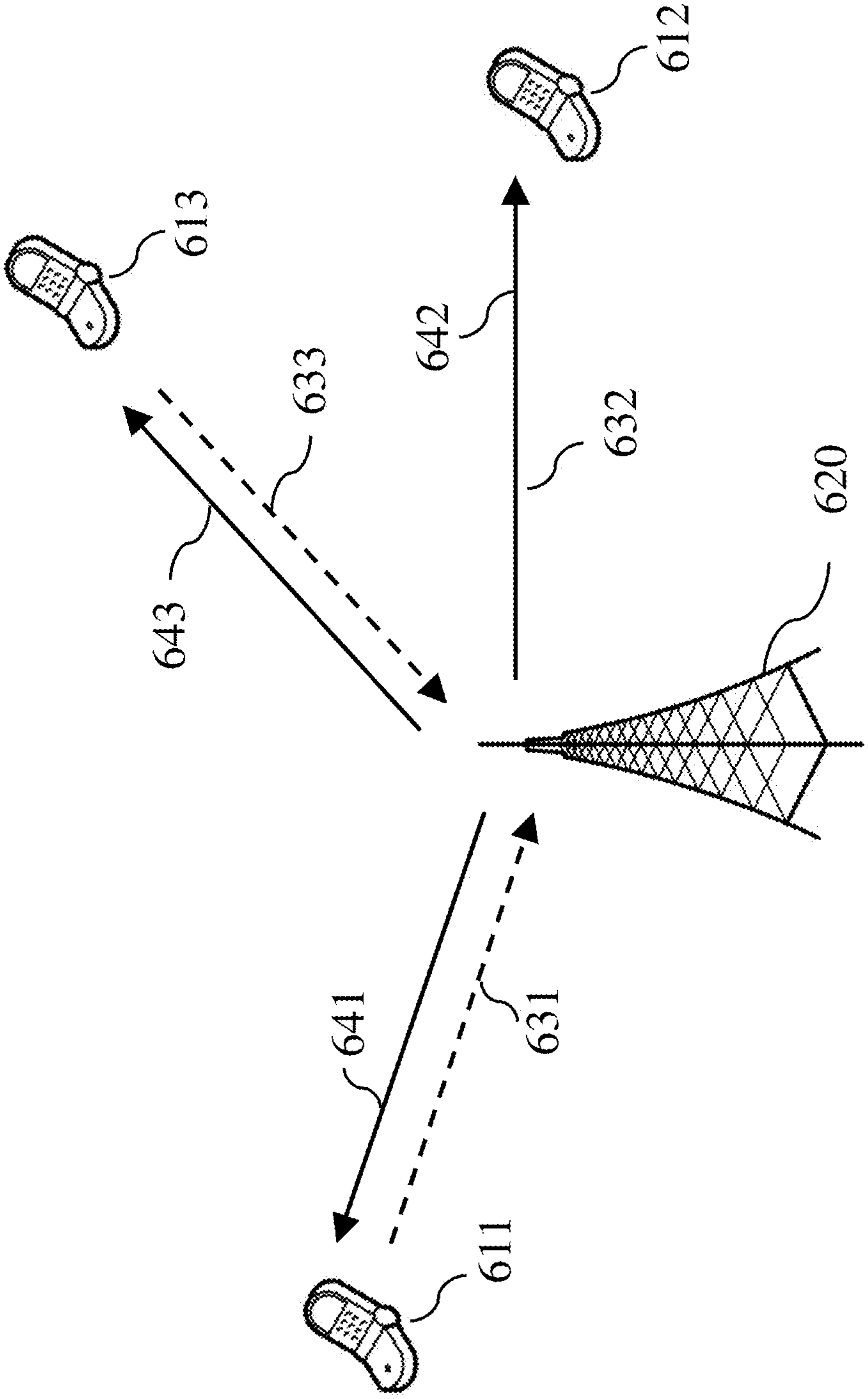
FIG. 4 shows an example of wireless communication including a base station (BS) and user equipment (UE) based on some implementations of the disclosed technology.

The implementations as discussed above will apply to a wireless communication. FIG. 4 shows an example of a wireless communication system (e.g., a 5G or NR cellular network) that includes a base station 620 and one or more user equipment (UE) 611, 612 and 613. In some embodiments, the UEs access the BS (e.g., the network) using implementations of the disclosed technology 631, 632, 633), which then enables subsequent communication (641, 642, 643) from the BS to the UEs. The UE may be, for example, a smartphone, a tablet, a mobile computer, a machine to machine (M2M) device, an Internet of Things (IoT) device, and so on.

Figure 5:
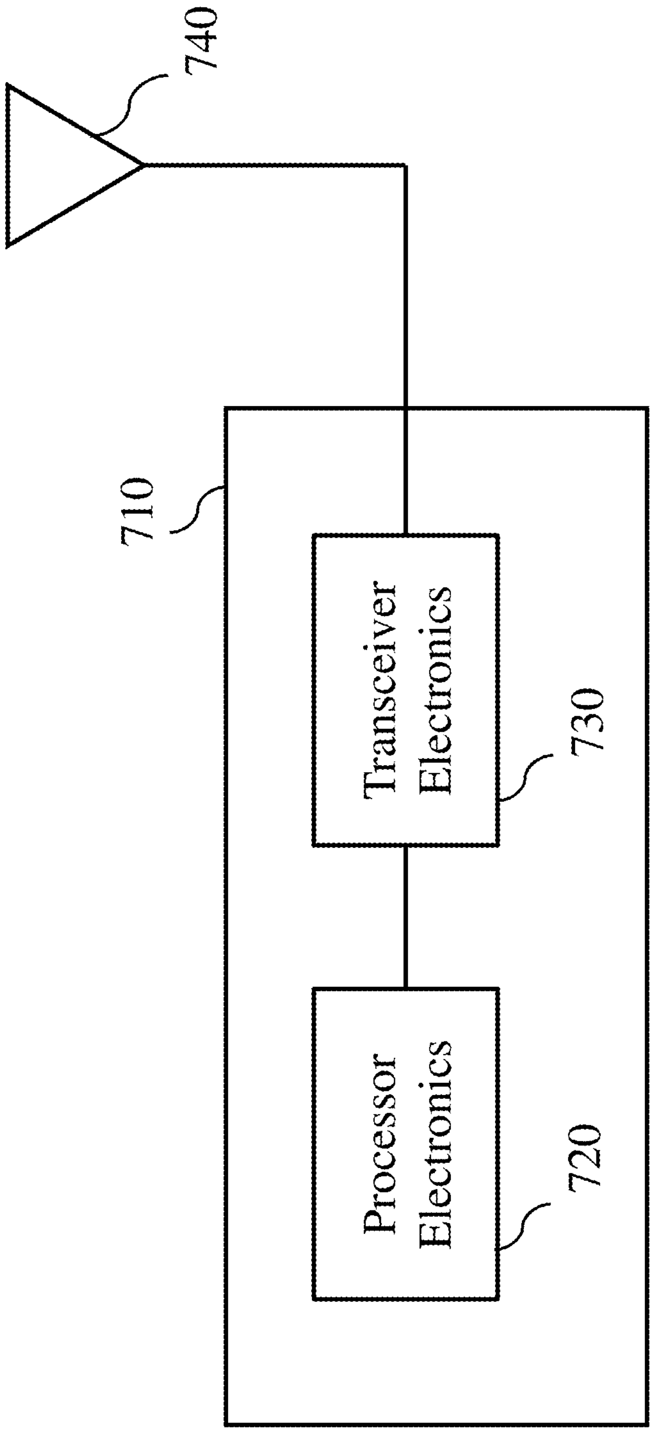
FIG. 5 shows an example of a block diagram of a portion of an apparatus based on some implementations of the disclosed technology.

FIG. 5 shows an example of a block diagram representation of a portion of an apparatus. An apparatus 710 such as a base station or a user device which may be any wireless device (or UE) can include processor electronics 720 such as a microprocessor that implements one or more of the techniques presented in this document. The apparatus 1010 can include transceiver electronics 730 to send and/or receive wireless signals over one or more communication interfaces such as antenna 740. The apparatus 710 can include other communication interfaces for transmitting and receiving data. The apparatus 710 can include one or more memories (not explicitly shown) configured to store information such as data and/or instructions. In some implementations, the processor electronics 720 can include at least a portion of transceiver electronics 730. In some embodiments, at least some of the disclosed techniques, modules or functions are implemented using the apparatus 710.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

checking a validity of each indicator based on a predetermined rule;

removing one or more invalid indicators from a first parameter set to provide a modified parameter set; and determining, by a communication device, one or more candidate transmission occasions based on the modified parameter set, and wherein the modified parameter set includes one or more valid indicators that are valid according to the predetermined rule, wherein the determining determines a total number of the one or more candidate transmission occasions is set to be equal to a number of the one or more invalid indicators, $j_{invalid}$ based on determining that the modified parameter set is an empty set, and the determining determines the total number of the one or more candidate transmission occasions is $j_{invalid}+j_{pp}$ based on determining that the modified parameter set is not the empty set, where $j_{pp}$ corresponds to a number of candidate transmission occasion obtained by a pruning procedure that identifies a non-overlapping transmission within a slot based on the modified parameter set.

2. The method of claim 1, wherein each indicator corresponds to a SLIV (start and length indicator) for a time domain allocation for a corresponding physical downlink shared channel (PDSCH)) that is a last configured SLIV in each row of a time domain resource allocation (TDRA) table.

3. The method of claim 1, wherein the determining determines the one or more candidate transmission occasions based on a capability of a user device for receiving multiple transmissions within a slot.

4. The method of claim 3, wherein the multiple transmissions correspond to multiple physical downlink shared channel (PDSCH) receptions.

5. The method of claim 1, further comprising: counting the number of the one or more invalid indicators, $j_{invalid}$.

6. The method of claim 1, wherein $j_{pp}$ is set to 1 for a user device capability of receiving a single candidate transmission occasion only within the slot and $j_{pp}$ is set to a value equal to or greater than 1 for a user device capability of receiving multiple candidate transmission occasions within the slot.

7. The method of claim 1, further comprising:

configuring a second parameter set to include the one or more invalid indicators that are removed from the first parameter set, wherein the one or more invalid indicators in the second parameter set are used to determine the one or more candidate transmission occasions.

8. The method of claim 7, wherein each invalid indicator in the second parameter set corresponds a candidate transmission occasion.

9. The method of claim 7, further comprising:

determining an order of the one or more invalid indicators based on a last orthogonal frequency division multiplexing (OFDM) symbol index of each of the one or more invalid indicators.

10. The method of claim 9, wherein determining the order comprises assigning, to an invalid indicator with a smaller last orthogonal frequency division multiplexing (OFDM) symbol index, a candidate transmission occasion with a smaller index as compared to another invalid indicator in a second parameter set.

11. The method of claim 1, wherein the communication device is a user device or a base station.

12. A communication apparatus, comprising:

processor electronics; and a memory coupled to the processor electronics and storing instructions that, upon execution by the processor electronics, cause the communication apparatus to:

check a validity of each indicator based on a predetermined rule;

remove one or more invalid indicators from a first parameter set to provide a modified parameter set; and determine one or more candidate transmission occasions based on the modified parameter set, and wherein the modified parameter set includes one or more valid indicators that are valid according to the predetermined rule, wherein the determining determines a total number of the one or more candidate transmission occasions is set to be equal to a number of the one or more invalid indicators, $j_{invalid}$ based on determining that the modified parameter set is an empty set, and the determining determines the total number of the one or more candidate transmission occasions is $j_{invalid}+j_{pp}$ based on determining that the modified parameter set is not the empty set, where $j_{pp}$ corresponds to a number of candidate transmission occasion obtained by a pruning procedure that identifies a non-overlapping transmission within a slot based on the modified parameter set.

13. The communication apparatus of claim 12, wherein each indicator corresponds to a SLIV (start and length indicator) for a time domain allocation for a corresponding physical downlink shared channel (PDSCH)) that is a last configured SLIV in each row of a time domain resource allocation (TDRA) table.

14. The communication apparatus of claim 12, wherein the determining determines the one or more candidate transmission occasions based on a capability of a user device for receiving multiple transmissions within a slot, and wherein the multiple transmissions correspond to multiple physical downlink shared channel (PDSCH) receptions.

15. The communication apparatus of claim 12, further comprising:

counting the number of the one or more invalid indicators, $j_{invalid}$.

16. The communication apparatus of claim 15, wherein $j_{pp}$ is set to 1 for a user device capability of receiving a single candidate transmission occasion only within the slot and $j_{pp}$ is set to a value equal to or greater than 1 for a user device capability of receiving multiple candidate transmission occasions within the slot.

17. The communication apparatus of claim 12, wherein the instructions further cause the communication apparatus to:

configure a second parameter set to include the one or more invalid indicators that are removed from the first parameter set, wherein the one or more invalid indicators in the second parameter set are used to determine the one or more candidate transmission occasions.

18. The communication apparatus of claim 17, wherein each invalid indicator in the second parameter set corresponds a candidate transmission occasion.

19. The communication apparatus of claim 17, wherein the instructions further cause the communication apparatus to:

determine an order of the one or more invalid indicators based on a last orthogonal frequency division multiplexing (OFDM) symbol index of each of the one or more invalid indicators, and wherein determining the order comprises assigning, to an invalid indicator with a smaller last OFDM symbol index, a candidate transmission occasion with a smaller index as compared to another invalid indicator in a second parameter set.

* * * * *